United States Patent [19]
Bhatia

[11] Patent Number: 5,588,114
[45] Date of Patent: Dec. 24, 1996

[54] METHOD AND APPARATUS FOR PASSIVE LOOPBACK TESTING OF SOFTWARE-CONTROLLABLE PARALLEL PORTS

[75] Inventor: Pradeep H. Bhatia, Salem, N.H.

[73] Assignee: Sun Microsystems, Inc., Mountain View, Calif.

[21] Appl. No.: 499,016

[22] Filed: Jul. 6, 1995

[51] Int. Cl.⁶ .......................... G01R 31/28; G06F 11/00
[52] U.S. Cl. ..................... 395/183.01; 371/20.5
[58] Field of Search ................ 395/183.01, 183.2; 371/20.4, 20.5

[56] References Cited

U.S. PATENT DOCUMENTS

| | | | |
|---|---|---|---|
| 4,670,709 | 6/1987 | Iredak | 324/73 R |
| 5,250,908 | 10/1993 | Liu | 324/542 |
| 5,254,953 | 10/1993 | Crook | 324/538 |
| 5,414,343 | 5/1995 | Flaherty | 324/66 |
| 5,436,554 | 7/1995 | Decker | 324/66 |

*Primary Examiner*—Robert W. Beausoliel, Jr.
*Assistant Examiner*—Glenn Snyder
*Attorney, Agent, or Firm*—Flehr, Hohbach, Test, Albritton & Herbert; Michael A. Kaufman, Esq.

[57] ABSTRACT

The present invention includes a connector that mates to the software-controllable parallel port output connector on a host device, a passive logic unit, and, preferably, a host-executable software program. The connector provides four loop-back connections: the AUTOFEED and FAULT pins are looped-together, as are the STROBE and BUSY pins, the INITIALIZE and SELECT pins, and the SELECT IN and PRINTER ERROR pins. The eight pins for data line output signals are input to the passive logic, which logic logically "OR's" the data line signals. The logical-OR output signal is fed back to the ACKNOWLEDGE pin of the connector, and signal ground pins on the connector are connected to ground. During testing, the connector and passive logic unit are connected to the host output parallel port, which typically is a 1284-compliant or other Centronics parallel-compatible port. The host device executes the software program, causing combinations of "1's" and "0's" to be input to various pins in the host parallel port output connector. The resultant signal at the test connector ACKNOWLEDGE pin enables the host to determine integrity of the host output port signals and host output port connector. The software program can provide user-readable error messages in English on a monitor coupled to the host, advising technicians as to what pin or pins are open or shorted on the host parallel port connector.

19 Claims, 3 Drawing Sheets

METHOD AND APPARATUS FOR PASSIVE LOOPBACK TESTING OF SOFTWARE-CONTROLLABLE PARALLEL PORTS

FIELD OF THE INVENTION

The present invention relates generally to testing output ports on a host system such as a computer, and more particularly to methods and apparatuses for passively testing software-controllable parallel ports, including the 1284-complaint standard parallel port, and other Centronics parallel-compatible ports.

BACKGROUND OF THE INVENTION

As shown by FIG. 1, host equipment 10 such as a personal computer, a work station or the like, typically includes a central processor unit ("CPU") 20 and memory 30. Signals to and from host 10 are communicated via one or more ports, such as port 40. A cable 50 is coupled between host 10 and one or more peripheral devices 60 (e.g., a printer) through a port 70 on the device. Cable 50 has a first connector 80 that mates with a connector on the host port 40, and has a second connector 90 that mates with a connector on the peripheral port 70. For ease of illustration, cable connectors 80 and 90 are shown spaced-apart from their mating connectors on host 10 and peripheral 60, respectively. In practice, connector 80 mates with connector 40, and connector 90 mates with connector 70.

Port 40 will typically be governed by an industry-accepted standard that defines port connector pin-out, signal functions, and signal levels. For a parallel port, there will be many signal pins, and cable 50 will comprises a number of conductors. A recently proposed parallel port specification is the I.E.E.E. P-1284 D2.00 (Sep. 10, 1993) standard, a Centronics parallel-compatible port. This specification is expected to be adopted by computer and workstation manufacturers.

Tables 1, 2 and 3 below set forth pin-outs and other information for the 1284-A, 1284-B and 1284-C connector pin assignments under this proposed standard. In these tables, "Bi-Di" denotes that the bi-directional data signals can be read by some, but not all, host devices, "H" denotes the host, and "P" denotes the peripheral device. Notation such as "nAck" means that the "ACKNOWLEDGE" signal is active when low, or "0". The "Compatible" and "ECP" columns refer to the compatible per se and the extended capability port modes of a 1284-compliant parallel port. The present invention is directed to the "Compatible" mode, but other modes are also possible.

Typically the parallel port signals from host 10 are provided by an integrated circuit ("IC"), such as IC 100 in FIG. 1. One such product is the so-called NEC super-I/O IC that provides two serial output ports, a floppy disk controller, an IDE drive interface, and a mode-selectable parallel port. Programming a particular mode into such an IC, e.g., via CPU 20, can select (among other functions) the mode of operation of parallel port 40. Thus, port 40 can be software-operated as a 1284-compliant compatible port, or other Centronics parallel-compatible port. Suitable mode-control software may be stored in memory 30, as shown in FIG. 1.

TABLE 1

| 1284-A Connector Pin Assignment | | | |
|---|---|---|---|
| Pin # | Source | Compatible | ECP |
| 1 | H | nStrobe | Host Clk |
| 2 | Bi-Di | Data 1 (Least Significant Bit) | |
| 3 | Bi-Di | Data 2 | |
| 4 | Bi-Di | Data 3 | |
| 5 | Bi-Di | Data 4 | |
| 6 | Bi-Di | Data 5 | |
| 7 | Bi-Di | Data 6 | |
| 8 | Bi-Di | Data 7 | |
| 9 | Bi-Di | Data 8 (Most Significant Bit) | |
| 10 | P | Nack | Peripheral Clock |
| 11 | P | Busy | Peripheral Ack |
| 12 | P | PError | nAckReverse |
| 13 | P | Select | Xflag |
| 14 | H | nAutoFd | HostAck |
| 15 | P | nFault | nPeriphRequest |
| 16 | H | nInit | nReverseRequest |
| 17 | H | nSelectIn | 1284 Active |
| 18 | | Sig'l Gnd (Nstrobe) | |
| 19 | | Sig'l Gnd (Data 1 and Data 2) | |
| 20 | | Sig'l Gnd (Data 3 and Data 4) | |
| 21 | | Sig'l Gnd (Data 5 and Data 6) | |
| 22 | | Sig'l Gnd (Data 7 and Data 8) | |
| 23 | | Sig'l Gnd (Busy and Nfault) | |
| 24 | | Sig'l Gnd (Perror, Select, & Nack) | |
| 25 | | Sig'l Gnd (Nautofd, Nselectin, & Ninit) | |

Connector 80 will be a 25 pin subminiature D-shell type connector when the host output parallel port 40 follows a 1284-A connector pin assignment. By contrast, connector will be a miniature 36 pin ribbon type connector when host output parallel port 40 follows a 1284-B or 1284-C connector pin assignment.

Table 1 is also applicable to other Centronics parallel-compatible ports if it is recognized that pins 2–9 are then unidirectional output only signals driven by the host, and that pins 18–25 are then ground pins.

TABLE 2

| 1284-B Connector Pin Assignment | | | |
|---|---|---|---|
| Pin # | Source | Compatible | ECP |
| 1 | H | Nstrobe | HostClk |
| 2 | Bi-Di | Data 1 (Least Significant Bit) | |
| 3 | Bi-Di | Data 2 | |
| 4 | Bi-Di | Data 3 | |
| 5 | Bi-Di | Data 4 | |
| 6 | Bi-Di | Data 5 | |
| 7 | Bi-Di | Data 6 | |
| 8 | Bi-Di | Data 7 | |
| 9 | Bi-Di | Data 8 (Most Significant Bit) | |
| 10 | P | Nack | PeriphClk |
| 11 | P | Busy | PeriphAck |
| 12 | P | Perror | Nackreverse |
| 13 | P | Select | Xflag |
| 14 | H | Nautofd | HostAck |
| 15 | | Not Defined | |
| 16 | | Logic Gnd | |
| 17 | | Chassis Gnd | |
| 18 | P | Peripheral Logic High | |
| 19 | | Sig'l Gnd (Nstrobe) | |
| 20 | | Sig'l Gnd (Data 1) | |
| 21 | | Sig'l Gnd (Data 2) | |
| 22 | | Sig'l Gnd (Data 3) | |
| 23 | | Sig'l Gnd (Data 4) | |
| 24 | | Sig'l Gnd (Data 5) | |
| 25 | | Sig'l Gnd (Data 6) | |
| 26 | | Sig'l Gnd (Data 7) | |
| 27 | | Sig'l Gnd (Data 8) | |
| 28 | | Sig'l Gnd (Perror, Select, Nack) | |
| 29 | | Sig'l Gnd (Busy, Fault) | |

TABLE 2-continued

1284-B Connector Pin Assignment

| Pin # | Source | Compatible | ECP |
|---|---|---|---|
| 30 | | Sig'l Gnd (Nautofd, Nselectin, Ninit) | |
| 31 | H | Ninit | Nreverserequest |
| 32 | P | Nfault | Nperiphrequest |
| 33 | | | Not Defined |
| 34 | | | Not Defined |
| 35 | | | Not Defined |
| 36 | H | Nselectin | 1284 Active |

TABLE 3

1284-C Connector Pin Assignment

| Pin # | Source | Compatible | ECP |
|---|---|---|---|
| 1 | P | Busy | PeriphAck |
| 2 | P | Select | Xflag |
| 3 | P | Nack | PeriphClk |
| 4 | P | Nfault | Nperiphrequest |
| 5 | P | Perror | Nackreverse |
| 6 | Bi-Di | | Data 1 (Least Significant Bit) |
| 7 | Bi-Di | | Data 2 |
| 8 | Bi-Di | | Data 3 |
| 9 | Bi-Di | | Data 4 |
| 10 | Bi-Di | | Data 5 |
| 11 | Bi-Di | | Data 6 |
| 12 | Bi-Di | | Data 7 |
| 13 | Bi-Di | | Data 8 (Most Significant Bit) |
| 14 | H | Ninit | Nreverserequest |
| 15 | H | Nstrobe | HostClk |
| 16 | H | Nselectin | 1284 Active |
| 17 | H | Nautofd | HostAck |
| 18 | H | | Host Logic High |
| 19 | | | Signal Ground (Busy) |
| 20 | | | Signal Ground (Select) |
| 21 | | | Signal Ground (Nack) |
| 22 | | | Signal Ground (nfault) |
| 23 | | | Signal Ground (PError) |
| 24 | | | Signal Ground (Data 1) |
| 25 | | | Signal Ground (Data 2) |
| 26 | | | Signal Ground (Data 3) |
| 27 | | | Signal Ground (Data 4) |
| 28 | | | Signal Ground (Data 5) |
| 29 | | | Signal Ground (Data 6) |
| 30 | | | Signal Ground (Data 7) |
| 31 | | | Signal Ground (Data 8) |
| 32 | | | Signal Ground (nInit) |
| 33 | | | Signal Ground (nStrobe) |
| 34 | | | Signal Ground (nSelectIn) |
| 35 | | | Signal Ground (nAutoFd) |
| 36 | P | | Peripheral Logic High |

One problem with testing parallel ports, whether defined by the P-1284 D2.00 standard or by another standard, is that active test equipment must be used. By "active" it is meant that the port-testing equipment requires an external power supply, typically a power supply that operates from 110/220 VAC. Providing this power can require re-wiring the test chamber in which the host equipment is to be tested.

Further, when temperature testing the host equipment, a sufficiently large test oven must be provided to accommodate the additional bulk and wiring associated with the parallel port test equipment. Modern host test facilities are automated, with the host equipment being handled robotically at the test station. But the necessity to couple wires, equipment, and an AC-generated power supply for testing a host parallel port is cumbersome, expensive, and slows the automated test process.

Thus, there is a need for a method and apparatus for testing a software-controllable parallel port without using bulky test equipment. Preferably such testing should occur using a small, passively operated, stand-alone device. The present invention discloses such a method and test device.

SUMMARY OF THE INVENTION

The present invention includes a connector that mates to a software-controllable parallel output port on a host device, such as a 1284-compliant or other Centronics parallel-compatible port, a passive logic unit, and a preferably host-executable software program. The connector provides four loop-back connections: the AUTOFEED and FAULT pins are looped-together, as are the STROBE and BUSY pins, the INITIALIZE and SELECT pins and the SELECT IN and PRINTER ERROR pins. The eight pins for data control line output signals are provided as input to the passive logic unit. The passive logic logically "OR's" the data control line signals, and provides an output signal that is fed back to the ACKNOWLEDGE pin of the connector. The signal ground pins on the connector are connected to ground.

During testing, applicant's connector with its loop-back connections and passive logic unit are connected to the host parallel port. A software program, according to the present invention, is executed by the host, causing combinations of "1's" and "0's" to be input to various pins in the host parallel port output connector. Coupling the passive logic unit output signal to the ACKNOWLEDGE pin enables the host to determine integrity of the host output port signals and host output port connector. The software program can also generate error messages in English on a monitor coupled to the host, advising technicians as to what pin or pins are open or shorted on the host parallel port connector.

The loop-back connections and passive logic unit can be implemented within the connector package. The result is a compact stand-alone passive test device that requires no external power leads for testing integrity of the host parallel port signal lines and connector pins.

Other features and advantages of the invention will appear from the following description in which the preferred embodiments have been set forth in detail in conjunction with the accompanying drawings.

DETAILED DESCRIPTION OF THE PREFERRED EMBODIMENTS

Figure 1:
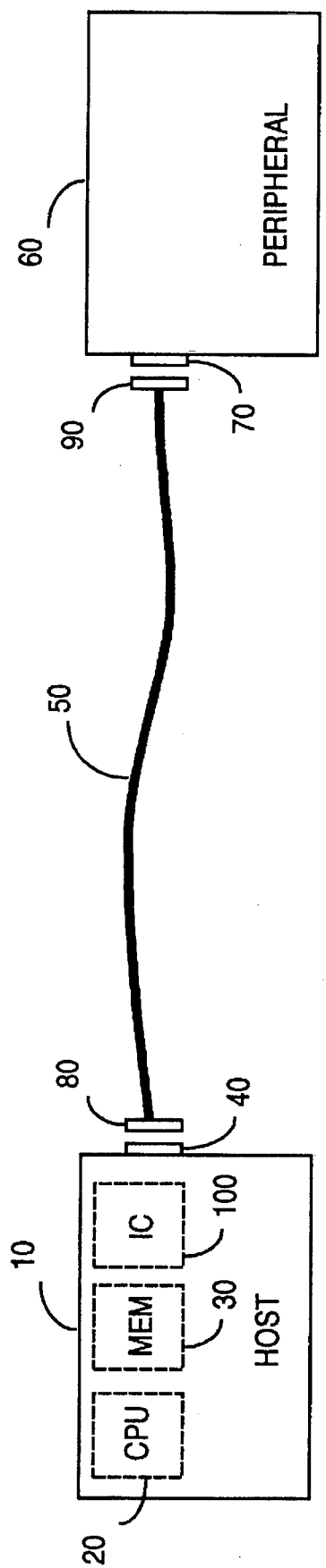
FIG. 1 depicts a host connected to a peripheral device by a cable connected to the host parallel output port, according to the prior art.
Figure 2:
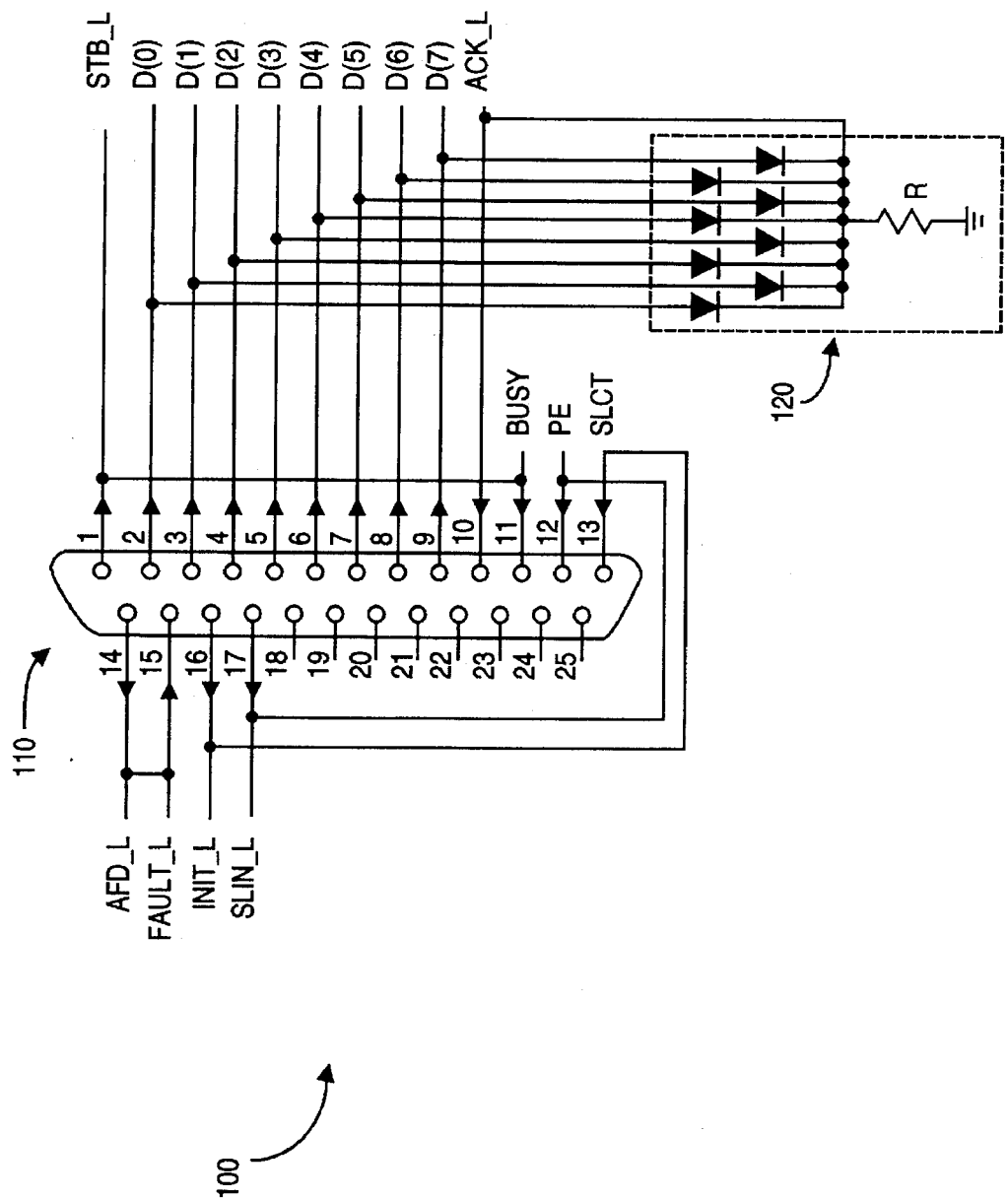
FIG. 2 depicts a 1284-A pin assignment test connector, loop-back connections and passive logic unit, according to the present invention.

FIG. 2 depicts the hardware portion of the present invention 100 as including a connector 110 having four looped-back connections, and a passive logic unit 120. The inputs to the passive logic unit are coupled to various pins on connector 110, and the passive logic unit output is fed back to the ACKNOWLEDGE pin of connector 110. Arrows pointing away from the connector indicate that the associated pin carries a host output control line signal, e.g., the STROBE output signal on pin 1. Arrows pointing into the connector indicate that the associated pin carries a host input status line signal, e.g., FAULT on pin 15. Pins 18–25 are each coupled to ground.

The connector pin configuration shown in FIG. 2 corresponds to the 25-pin 1284-A connector assignment enumerated in Table 1. It is understood that for 1284-B and 1284-C connector assignments, the number of pins and pin numbers will be different, but that the same pin functions will be used in the same manner. Other Centronics parallel-compatible ports may also be tested in the same manner.

According to the present invention, four looped-back connections are made. With reference to the 1284-A connector assignment of FIG. 2, the output AUTOFEED ("AFD_L") signal at pin 14 is fed back as the input FAULT ("FAULT_L") signal at pin 15 to form a first looped-back connection. (The nomenclature xxx_L indicates that the xxx signal is active when low, e.g., AUTOFEED and FAULT are both active when "0".) The INITIALIZE ("INIT_L") output signal at pin 16 is fed back as the input SELECT ("SLCT") signal at pin 13 to form a second looped-back connection. The output SELECT IN ("SLIN_L") signal at pin 17 is fed back as the input PRINTER ERROR ("PE") signal at pin 12 to form a third looped-back connection. The STROBE ("STB_L") output signal at pin 1 is fed back as the BUSY input signal to pin 11, to form the fourth looped-back connection.

Passive logic unit 120 comprises eight generic diodes and a load resistor R of perhaps 470 Ω for the 0 V to 5 V (e.g., $V_{CC}$) parallel port logic signals. The diode anodes are coupled to receive the eight-bit control line host output signals D(0) through D(7). The diode cathodes are summed together across a load resistor R (typically about 470 Ω) to form an output signal that is coupled as input to the ACKNOWLEDGE pin 10. So configured, logic unit 120 provides an output signal to the ACKNOWLEDGE pin that is the logic "OR" of "D(0)+D(1)+D(2)+D(3)+D(4)+D(5)+D(6)+D(7)".

Figure 3:
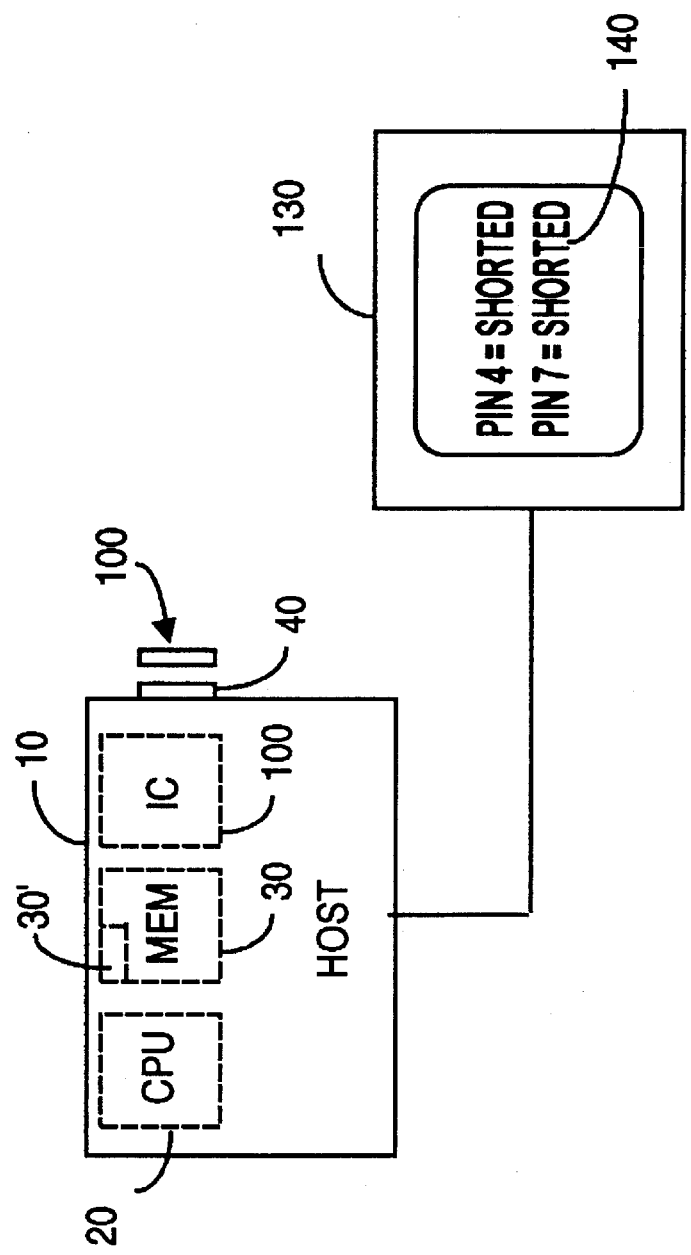
FIG. 3 depicts testing of a host using a passive test connector, according to the present invention.

FIG. 3 depicts use of the present invention in testing integrity of the 1284-complaint output parallel port 40 on host 31. As depicted, hardware 100, e.g., mating connector 110 with its looped-back connections and passive logic 120, is plugged into the host parallel port output connector. (Again, for ease of illustration hardware 100 is shown slightly spaced-apart from the host parallel port output connector.) During testing, hardware 100 replaces a peripheral device 60, and connecting cable 50, and connector 80. FIG. 3 further depicts a monitor 130 coupled to the host 10, for displaying any error messages 140 generated by CPU 20 in response to the ACKNOWLEDGE signal generated by passive logic 120.

Also shown in FIG. 3 is a software routine 30' loaded or stored in memory 30, which memory could be random access memory, or persistent storage memory such as a hard disk or diskette. Preferably testing of at least the parallel port 40 of host 10 occurs under control of computer routine 30' under execution of CPU 20. APPENDIX 1 is a listing of a FORTH language routine written by applicant for this purpose, although other routines could instead be used. It is also understood that the functions implemented by APPENDIX 1 could also be written in other than the FORTH programming language. Alternatively, combinations of "0" and "1" signals to the host parallel port pins could be manually toggled, but doing so would be considerably slower than "toggling" under control of program 30'. Computer program 30' first causes host 10 under test to set all parallel port 40 data lines D(0) through D(7) to logical "0". It is apparent from FIG. 2 when D(0) through D(7) are low, passive logic unit 120 should establish a "0" voltage level across resistor R, causing the ACKNOWLEDGE signal input to pin 10 to be "0". Thus, unless the ACKNOWLEDGE signal input by unit 120 is "0", there is an electrical short between the host $V_{CC}$ power supply at host port 40 and at least one of pins 2–9 (for the 1284-A connector pin assignment depicted). CPU 20 in execution of applicant's routine shown in APPENDIX 1 can identify a non-"0" ACKNOWLEDGE signal during this portion of the testing, and can cause monitor 130 to display a message 140 appropriate to the test results.

Next, applicant's routine in memory 30' will cause CPU 20 to sequentially set each of data lines D(0) through D(7) to a logical "1" level, one line at a time. This should cause the voltage developed across resistor R within logic unit 120 to be a logical "1" unless the pin under test is shorted to ground or is open. Thus, if during this phase of the testing the ACKNOWLEDGE signal returned by unit 120 to pin 10 is not "1", then the data line under test is either shorted to ground or is open. Again, if desired, monitor 130 can display an appropriate error message 140.

In similar fashion, CPU 20 can then test the other lines in the host connector by applying an appropriate "0" or "1" signal to the AUTOFEED pin, then to the INITIALIZE pin, then to the SELECT INITIALIZE pin, and then to the STROBE pin. The looped-back connections then permit examination by CPU 30 of the, respective, FAULT pin, SELECT pin, PRINTER ERROR pin, and BUSY pin to confirm integrity of the pin-pairs in question, e.g., pins 14 and 15, pins 16 and 13, pins 17 and 12, and pins 1 and 11. In executing applicant's routine, CPU 20 again can cause monitor 130 to display an appropriate error message 140.

Of course applicant's routine could examine integrity of the host parallel output port lines and connector pins in other than the order described. If desired, connector 110 could also be provided with light emitting diodes ("LED's") or the like, to optically signal error conditions without reliance upon an external monitor 130.

Parallel port testing as shown in FIG. 3 typically occurs in conjunction with testing of other features of host 10, the testing often occurring within a high temperature test oven. It will be appreciated that the hardware portion of the present invention 100 may be implemented within the shell of connector 110. However, even if logic unit 120 and the four loop-back connections are implemented on a small printed circuit board, the small sized circuit board, e.g., about 1" (2.54 cm)×2" (5 cm), can be attached to the shell of connector 110. In either event, package. The result is a compact stand-alone passive test hardware 100 is a stand-alone test device that requires no external power leads to test integrity of the host parallel port signal lines and connector pins. As such, no special wiring or other accommodations within a test oven are required, in contrast to prior art parallel port test mechanisms.

Those skilled in the art will appreciate that the 1284-A connector pin assignment schematic of FIG. 2 is readily modified for the 1284-B and 1284-C connector pin assignments.

With reference to Table 2, for example, for a host parallel port using a 1284-B connector pin assignment, AUTOFEED-FAULT loop back connections is made by coupling together pins 14 and 32, the INITIALIZE-SELECT loop back is made using pins 31 and 13, the SELECT INPUT-PRINTER ERROR loop back is made using pins 36 and 12, and the STROBE-BUSY loop back is made using pins 1 and 11. The D(0)–D(7) data control lines are present at pins 2–9, and the ACKNOWLEDGE signal provided by logic 120 would be returned as an input to pin 10. Pins 19–30 would be grounded.

Similarly, from Table 3 it is seen that for a host parallel port using a 1284-C connector pin assignment, the schematic of FIG. 2 would be altered as follows. The AUTO-FEED-FAULT loop back connections is made by coupling together pins 17 and 4, the INITIALIZE-SELECT loop back is made using pins 14 and 2, the SELECT INPUT-PRINTER ERROR loop back is made using pins 16 and 5, and the STROBE-BUSY loop back is made using pins 15 and 1. The D(0)–D(7) data control lines are present at pins 6–13, and the ACKNOWLEDGE signal provided by logic 120 would be returned as an input to pin 3. Pins 19–35 would be grounded.

If desired, the present invention may be implemented as a port of the host device circuitry. A dedicated parallel port test circuit could be fabricated as part of the host 10 motherboard, or as a plug-in card or accessory circuit within host 10. Such circuit would include multiplexers operating under command of CPU 20 and program 30' to couple-together pins of port 20 to form the four loop-back connections. Similarly, such circuit would include OR-logic coupled to the D(0)–D(7) pins on connector 40. The OR-logic would generate and return, through a multiplexer, the ACKNOWLEDGE signal to the appropriate pin of host parallel port connector 40. Such circuit could be implemented as an application specific integrated circuit ("ASIC"), or fabricated using discrete multiplexers and a multi-input OR gate.

Modifications and variations may be made to the disclosed embodiments without departing from the subject and spirit of the invention as defined by the following claims.

```
\ copyright (c) 1995 Sun Microsystems Computer Corporation.
\ by P.Bhatia hex
create sio-init-table
        00 c, 01 c,             \ Setup the Function Enable Register to 0x01,
                                \ only parallel port enable
        03 c, 00 c,             \ Setup the Function Control Register to 0x00
        04 c, 00 c,             \ Setup the Printer Control Register to 0x00
        06 c, 00 c,             \ Setup the Power Management Control Register to 00
        07 c, 00 c,             \ Setup the Tape, UARTs and Parallel Port
                                \ Config Register to 00
        02 c, 80 c,             \ Setup the Power and Test Register to 0x80 variable sio-pp-errors 398 eb-cs4+ constant sioaddr    \ eb-cs4 is defined in a previously loaded routine
399 eb-cs4+ constant siodata : sioaddr! sioaddr c! ;         \ Config Address Register write
: siodata! siodata c! ;         \ Config Data Register write
: sioaddr@ sioaddr c@ ;         \ Config Address Register read
: siodata@ siodata c@ ;         \ Config Data Register read : str@ str c@ ;                 \ Parallel Port Status Register read
: ctr@ ctr c@ ;                 \ Parallel Port Control Register read
: ctr! ctr c! ;                 \ Parallel Port Control Register write : dtr! dtr c! ;                 \ Parallel Port Data Register write
: dtr@ dtr c@ ;                 \ Parallel Port Data Register read headers
: sio-init-cfg ( -- )
    d# 6 0 do
        sio-init-table i 2* + dup c@
        sioaddr!  1+ c@ dup
        siodata! siodata!
    loop
;

: reset-pp  ( -- )     sio-init-cfg 0 ctr! ;

: sio-rd-cfg ( offset -- char )   sioaddr! siodata@ ;

: sio-wr-cfg ( char offset -- )
        sioaddr! dup siodata! siodata!
;

: sio-dump-cfg ( -- )
        9 0 do
            i sio-rd-cfg .
            space
        loop
        cr
;

: pp-status?  ( byte1 byte2 -- byte flag )  swap ctr! str@ dup rot <> ;

: pp-status-mask? ( byte2 mask byte1 -- byte flag )
    ctr! ( byte2 mask )
    str@ ( byte2 mask byte )
    swap ( byte2 byte mask )
    over ( byte2 byte mask byte )
    and  ( byte2 byte masked-byte)
    rot  ( byte masked-byte byte2 )
    <>   ( byte flag )
```

APPENDIX 1

```
;

: pp-error
        ." PP Failed: "
;

: sio-pp-p-lp ( -- )
        reset-pp                                \ Reset the Parallel Port
        0 sio-pp-errors !                       \ errors init
        ." Checking DATA Bit Shorts to VCC" cr 0 dtr! str@ 40 and 0<>  if
                pp-error
                ." One of 8 Data Bits Stuck High   EXP 0, REC 1" cr
                sio-pp-errors incr exit
        then " Checking DATA Bit Opens" cr 8 0 do
                1 i << dtr! str@ dup 40 and 40 <> if
                        pp-error
                        ." Data Bit " i . ." EXP 1, REC " . cr
                        sio-pp-errors incr leave
                then
                drop
        loop sio-pp-errors @ 0<>  if  exit  then ." Checking PAIRs of STATUS / CONTROL Bits" cr ff dtr!

0 6f pp-status?  if
                pp-error
                ." Reset Wrote 00 Rec " . cr
                sio-pp-errors incr exit
        then
        drop 80 80 1 pp-status-mask?  if
                pp-error
                ." BUSY/STB Wrote 01 Rec " . cr
                sio-pp-errors incr exit
        then
        drop 0 8 2 pp-status-mask?  if
                pp-error
                ." ERROR/AFD Wrote 02 Rec " . cr
                sio-pp-errors incr exit
        then
        drop 10 10 4 pp-status-mask?  if
                pp-error
                ." SLCT/INIT Wrote 04 Rec " . cr
                sio-pp-errors incr exit
        then
        drop 0 20 8 pp-status-mask?  if
                pp-error
                ." SLIN/PE Wrote 08 Rec " . cr
                sio-pp-errors incr exit
```

```
then
drop

." Checking all STATUS / CONTROL Bits" cr 01 ef pp-status?  if
        pp-error
        ." BUSY/STB Wrote 01 Rec " . cr
        sio-pp-errors incr exit
then
drop 02 67 pp-status?  if
        pp-error
        ." ERROR/AFD Wrote 02 Rec " . cr
        sio-pp-errors incr exit
then
drop 04 7f pp-status?  if
        pp-error
        ." SLCT/INIT Wrote 04 Rec " . cr
        sio-pp-errors incr exit
then
drop 08 4f pp-status?  if
        pp-error
        ." SLIN/PE Wrote 08 Rec " . cr
        sio-pp-errors incr exit
then
drop sio-pp-errors @ 0= if
        ." PARALLEL PORT Test PASSED." cr
then
```

What is claimed is:

1. A passive device for testing integrity of a software-controllable output parallel port and output parallel port connector pins in a host device, comprising:

a test connector, sized to matingly engage said output parallel port connector pins;

said test connector having an AUTOFEED pin and a FAULT pin coupled-together to form a first loop-back connection, an INITIALIZE pin and a SELECT pin coupled-together to form a second loop-back connection, a SELECT IN pin and a PRINTER ERROR pin coupled-together to form a third loop-back connection, and a STROBE pin and a BUSY pin coupled-together to form a fourth loop-back connection, and further having SIGNAL GROUND pins coupled to ground;

a passive logic unit coupled to logically-OR DATA control line pins on said test connector and to passively provide a logical-OR output signal to an ACKNOWLEDGE pin on said test connector;

wherein during a test mode, combinations of "0" and "1" signals provided by said host device to said test connector result in a signal at said ACKNOWLEDGE pin of said test connector enabling said output parallel port to be tested for at least one condition selected from the group consisting of (i) open pins, (ii) shorted-to-ground pins, and (iii) shorted-to-power supply pins.

2. The passive device of claim 1, wherein said output parallel port is tested for open pins, for shorted-to-ground pins, and for shorted-to-power supply pins.

3. The passive device of claim 1, wherein said output parallel port is a Centronics parallel-compatible port.

4. The passive device of claim 1, wherein said output parallel port is 1284-compliant, and wherein said test connector has a configuration selected from the group consisting of (i) a 1284-A pin assignment, (ii) a 1284-B pin assignment, and (iii) a 1284-C pin assignment.

5. The passive device of claim 1, wherein said passive logic unit includes a load resistor, and a diode for each of said DATA control line pins on said test connector, each said diode having an anode lead coupled to one of said DATA control line pins on said test connector, and a cathode lead coupled to a non-grounded end of said load resistor;

wherein said ACKNOWLEDGE pin of said test connector is coupled to said non-grounded end of said load resistor.

6. A method for passively testing integrity of a software-controllable output parallel port and parallel output port connector pins in a host device, the method comprising the following steps:

(a) providing a test connector sized to matingly engage said output parallel port connector pins;

said test connector having an AUTOFEED pin and a FAULT pin coupled-together to form a first loop-back connection, an INITIALIZE pin and a SELECT pin coupled-together to form a second loop-back connection, a SELECT IN pin and a PRINTER ERROR pin coupled-together to form a third loop-back connection, and a STROBE pin and a BUSY pin coupled-together to form a fourth loop-back connection, and further having SIGNAL GROUND pins coupled to ground;

(b) passively logically-Oring DATA control line pins on said test connector and passively providing a logical-OR output signal to an ACKNOWLEDGE pin on said test connector;

wherein during a test mode, combinations of "0" and "1" signals provided by said host device to said test connector result in a signal at said ACKNOWLEDGE pin of said test connector enabling said output parallel port to be tested for at least one condition selected from the group consisting of (i) open pins, (ii) shorted-to-ground pins, and (iii) shorted-to-power supply pins.

7. The method of claim 6, wherein said output parallel port is tested for open pins, for shorted-to-ground pins, and for shorted-to-power supply pins.

8. The method of claim 6, wherein said output parallel port is a Centronics parallel-compatible port.

9. The method of claim 6, wherein said output parallel port is 1284-compliant, and wherein step (a) includes providing a said test connector having a configuration selected from the group consisting of (i) a 1284-A pin assignment, (ii) a 1284-B pin assignment, and (iii) a 1284-C pin assignment.

10. The method of claim 6, wherein said host device includes a central processor unit and associated memory, and wherein during said test mode, said combinations of "0" and "1" signals are provided by said host device under command of a software routine loaded in said memory and executed by said central processor unit.

11. The method of claim 10, wherein said host device is coupled to a monitor, and wherein during said test mode said software routine causes said monitor to display a user-readable message in response to a signal at said ACKNOWLEDGE pin of said test connector.

12. The method of claim 6, wherein step (b) includes providing a load resistor, and a diode for each of said DATA control line pins on said test connector, each said diode having an anode lead coupled to one of said DATA control line pins on said test connector, and a cathode lead coupled to a non-grounded end of said resistor;

wherein said ACKNOWLEDGE pin of said test connector is coupled to said non-grounded end of said load resistor.

13. A method for passively testing integrity of a Centronics parallel-compatible output parallel port and output parallel port connector pins in a host device, the method comprising the following steps:

(a) forming a first loop-back connection between an AUTOFEED pin and a FAULT pin on said output parallel port connector, forming a second loop-back connection between an INITIALIZE pin and a SELECT pin on said parallel output port connector, forming a third loop-back connection between a SELECT IN pin and a PRINTER ERROR pin on said parallel output port connector, forming a fourth loop-back connection between a STROBE pin and a BUSY pin on said parallel output port connector, and forming a ground connection with SIGNAL GROUND pins on said parallel output port connector;

(b) passively logically-Oring DATA control line pins on said output parallel port connector and passively providing a logical-OR output signal to an ACKNOWLEDGE pin on said output parallel port connector;

wherein during a test mode, combinations of "0" and "1" signals provided by said host device to said output parallel port connector result in a signal at said ACKNOWLEDGE pin enabling said output parallel port to be tested for open pins, for shorted-to-ground pins, and for shorted-to-power supply pins.

14. The method of claim 13, wherein said Centronics parallel-compatible port is a 1284-compliant output parallel port.

15. The method of claim 13, wherein step (a) is accomplished by providing a test connector sized to matingly engage said output parallel port connector pins;

said test connector having an AUTOFEED pin and a FAULT pin coupled-together to form a first loop-back connection, an INITIALIZE pin and a SELECT pin coupled-together to form a second loop-back connection, a SELECT IN pin and a PRINTER ERROR pin coupled-together to form a third loop-back connection, and a STROBE pin and a BUSY pin coupled-together to form a fourth loop-back connection, and further having SIGNAL GROUND pins coupled to ground.

16. The method of claim 15, wherein step (b) is accomplished by passively logically-Oring DATA control line pins on said test connector and passively providing a logical-OR output signal to an ACKNOWLEDGE pin on said test connector.

17. The method of claim 13, wherein said host device includes a central processor unit and associated memory, and wherein during said test mode, said combinations of "0" and "1" signals are provided by said host device under command of a software routine loaded in said memory and executed by said central processor unit.

18. The method of claim 17, wherein said host device is coupled to a monitor, and wherein during said test mode said software routine causes said monitor to display a user-readable message in response to a signal at said ACKNOWLEDGE pin.

19. The method of claim 13, wherein step (b) includes providing a load resistor, and a diode for each of said DATA control line pins on said parallel port connector, each said diode having an anode lead coupled to one of said DATA control line pins on said parallel port connector, and a cathode lead coupled to a non-grounded end of said resistor;

wherein said ACKNOWLEDGE pin of said parallel port connector is coupled to said non-grounded end of said load resistor.

* * * * *